(12) United States Patent
Kitada et al.

(10) Patent No.: US 6,486,281 B1
(45) Date of Patent: Nov. 26, 2002

(54) PROCESS FOR PREPARING HIGH-PURITY VINYLPYRROLIDONE POLYMER

(75) Inventors: Akira Kitada, Shiga (JP); Keiichi Fujise, Shiga (JP); Itsuko Hamaguchi, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/914,267
(22) PCT Filed: May 23, 2001
(86) PCT No.: PCT/JP01/04309
§ 371 (c)(1),
(2), (4) Date: Aug. 24, 2001
(87) PCT Pub. No.: WO00/96424
PCT Pub. Date: Dec. 20, 2001

(30) Foreign Application Priority Data

Jun. 15, 2000 (JP) .......................................... 2000-180310

(51) Int. Cl.[7] ................................................. C08F 26/08
(52) U.S. Cl. ........................ 526/264; 526/223; 526/230; 525/328.6; 525/383
(58) Field of Search ................................ 526/223, 230, 526/264; 525/328.6, 383

(56) References Cited

U.S. PATENT DOCUMENTS

| 5,286,844 A | * | 2/1994 | Nishida et al. ............. 528/484 |
| 5,354,945 A | | 10/1994 | Detering et al. |
| 5,922,777 A | * | 7/1999 | Van Rheenen ................ 521/28 |

FOREIGN PATENT DOCUMENTS

| JP | 7-206945 | 8/1995 |
| JP | 9-110933 | 4/1997 |

OTHER PUBLICATIONS

International Search Report (Japanese language) for PCT/JP01/04309 dated Jul. 3, 2001.

\* cited by examiner

*Primary Examiner*—Helen L. Pezzuto
(74) *Attorney, Agent, or Firm*—Sughrue Mion, PLLC

(57) ABSTRACT

A process for preparing a high purity vinylpyrrolidone polymer which dissolves clearly in an organic solvent can be provided. The process for preparing a high purity vinylpyrrolidone polymer, wherein vinylpyrrolidone is polymerized by using a redox initiator comprising an organic peroxide and a sulfite, and thereafter the product is contacted with an anion exchange resin to be purified.

8 Claims, No Drawings

PROCESS FOR PREPARING HIGH-PURITY VINYLPYRROLIDONE POLYMER

TECHNICAL FIELD

The present invention relates to a process for preparing a vinylpyrrolidone polymer, in particular, a process for preparing a high purity vinylpyrrolidone polymer which is soluble in an organic solvent such as isopropanol.

BACKGROUND ART

Concerning a process for preparing vinylpyrrolidone polymer, an initiator such as hydrogen peroxide, an azo compound or a redox initiator consisting of a peroxide and Rongalit is used conventionally. If one of these initiators is used, however, the resulting vinylpyrrolidone polymer is not useful for a cosmetic use because a by-product like 2-pyrrolidone or a by-product derived from the initiator is produced in a large amount.

Therefore, Applicant proposes a process for preparing a vinylpyrrolidone polymer by using a redox initiator consisting of an organic peroxide and a sulfite. Though a by-product like 2-pyrrolidone can be decreased in the process, the resulting vinylpyrrolidone polymer is insoluble in an organic solvent because sulfate ion and unreacted sulfite ion which are by-products remain in it.

DISCLOSURE OF THE INVENTION

It is an object of the present invention to provide a high purity vinylpyrrolidone polymer which has a decreased amount of a by-product derived from an initiator and is soluble in an organic solvent to be transparent.

Therefore, the present invention relates to a process for preparing a high purity vinylpyrrolidone polymer, which is characterized in polymerizing vinylpyrrolidone by using a redox initiator comprising an organic peroxide and a sulfite, and thereafter contacting the product with an anion exchange resin.

The present invention relates to the above-mentioned process for preparing a high purity vinylpyrrolidone polymer, wherein the sulfite is ammonium sulfite.

The present invention relates to the above-mentioned process for preparing a high purity vinylpyrrolidone polymer, wherein the organic peroxide is hydroperoxide.

The present invention relates to each of the above-mentioned processes for preparing a high purity vinylpyrrolidone polymer, wherein the organic peroxide is tert-butyl hydroperoxide.

The present invention relates to a high purity vinylpyrrolidone polymer containing a small amount of sulfate ion and sulfite ion, which is obtained by polymerizing vinylpyrrolidone using a redox initiator which contains an organic peroxide and a sulfite, and thereafter contacting the product with an anion exchange resin.

The present invention relates to the above-mentioned high purity vinylpyrrolidone polymer which contains at most 10 ppm of sulfate ion and at most 20 ppm of sulfite ion, based on the vinylpyrrolidone polymer.

BEST MODE FOR CARRYING OUT THE INVENTION

The process for preparing a high purity vinylpyrrolidone polymer of the present invention comprises polymerizing vinylpyrrolidone (hereinafter referred to as "VP") by using a redox initiator which contains an organic peroxide and a sulfite, and purifying by adding an anion (basic ion) exchange resin to the resulting vinylpyrrolidone polymer aqueous solution and contacting the product with the anion (basic ion) exchange resin to remove sulfate ion and sulfite ion. Vinylpyrrolidone (VP) ordinarily means N-vinyl-2-pyrrolidone.

A vinylpyrrolidone polymer implies a VP homopolymer and a copolymer consisting of VP and other monomers (the copolymer contains preferably at least 20% by weight, more preferably at least 30% by weight of VP units).

As other monomers, for example, acrylic acid, methacrylic acid, an alkylester of acrylic acid (for example, methyl acrylate and ethyl acrylate), an alkylester of methacrylic acid (for example, methyl methacrylate and ethyl methacrylate), an aminoalkylester of acrylic acid (for example, diethylaminoethyl acrylate), an aminoalkylester of methacrylic acid, a monoester of acrylic acid and a glycol, a monoester of methacrylic acid and a glycol (for example, hydroxyethyl methacrylate), an alkaline metal salt of acrylic acid, an alkaline metal salt of methacrylic acid, ammonium salt of acrylic acid, ammonium salt of methacrylic acid, a quaternary ammonium derivative of an aminoalkylester of acrylic acid, a quaternary ammonium derivative of an aminoalkylester of methacrylic acid, a quaternary ammonium compound of diethylaminoethylacrylate and methyl sulfate, vinyl methyl ether, vinyl ethyl ether, an alkaline metal salt of vinyl sulfonic acid, ammonium salt of vinyl sulfonic acid, styrene sulfonic acid, a styrene sulfonate, an allylsulfonic acid, an allyl sulfonate, methallylsulfonic acid, methallyl sulfonate, vinyl acetate, vinyl stearate, N-vinylimidazol, N-vinylacetamide, N-vinylcarbazol, acrylamide, methacrylamide, N-alkylacrylamide, N-methylolacrylamide, N, N-methylenebisacrylamide, a glycol diacrylate, a glycol dimethacrylate, divinylbenzene, a glycol diallylether, or the like are employed.

Polymerization of VP or copolymerization of VP and other monomers can be carried out according to a solution polymerization in an aqueous solvent or in a mixed solvent consisting of an aqueous solvent and an organic solvent. For example, VP can be polymerized by adding an organic peroxide aqueous solution and a sulfite aqueous solution to a VP aqueous solution.

As the VP aqueous solution, for example, an aqueous solution having a VP concentration of 10 to 60% by weight, preferably 20 to 50% by weight can be used. When an aqueous solution containing VP and other monomers is employed as the VP aqueous solution, the aqueous solution is 10 to 60% by weight, preferably 20 to 50% by weight, in total concentration of VP and other monomers. When the concentration of the VP aqueous solution is low, a low productivity and high cost tend to be caused. When the concentration of the VP solution is high, a trouble in the reaction tends to be caused because viscosity becomes high with passage of time during polymerization and stirring becomes difficult.

As the organic peroxide, for example, any hydroperoxide such as tert-hexyl hydroperoxide, p-menthane hydroperoxide, cumene hydroperoxide and tert-butyl hydroperoxide, and any peroxide such as benzoylperoxide, laurylperoxide and stearylperoxide can be used. Hydroperoxide is preferable among them from the fact that a by-product derived from the initiator is decreased. tert-Butyl hydroperoxide is preferable in particular because in case of employing tert-butyl hydroperoxide as an initiator by-products such as tert-butanol can be removed easily by heating, or by decompressing.

An organic peroxide is added in an amount of preferably 0.005 to 5% by weight, more preferably 0.02 to 3% by weight based on VP. When an organic peroxide is added in a small amount, the polymerization rate tends to decrease causing a low productivity. And when added in a large amount, the peroxide remains as impurities after polymerization, which is not preferable in a product quality, and tends to cause trouble in preparation of a polymer having a relatively high molecular weight.

The organic peroxide may be added in a form of solid or liquid or in a form of an aqueous solution.

A sulfite is used as a reductant. The sulfite produces sulfate ion in a redox reaction, but the sulfate ion can be adsorbed and removed easily by using an anion exchange resin. Therefore, the sulfite is suitable in the present invention as compared with other reductants. As the sulfite, for example, an ammonium salt of a sulfurous acid comprising sulfurous acid, thiosulfurous acid, hyposulfurous acid and metasulfurous acid, an alkaline metal salt thereof (for example, a sodium salt or a potassium salt thereof, an alkaline earth metal salt thereof (for example, a magnesium salt or a calcium salt thereof can be employed. Among those mentioned above, ammonium sulfite is more preferable because does not turn into an ash content and can be removed easily for the reason of its high volatility.

The sulfite is added in an amount of preferably 0.005 to 10% by weight, more preferably 0.02 to 7% by weight based on VP. When the sulfite is added in a small amount, a high polymerization ratio is difficult to be obtained and non-reacting monomers tend to remain in a large amount. And when added in a large amount, the sulfite or the oxide thereof, i.e. sulfate, tends to remain in products.

The sulfite can be added to a VP aqueous solution, for example, in a form of an aqueous solution.

The mole ratio of the organic peroxide and the sulfite is preferably 1:0.5 to 1:20 so that the organic peroxide does not remain in products.

The above-mentioned polymerization initiator may be added after or before the temperature of the above-mentioned VP aqueous solution is adjusted to a polymerization temperature.

The polymerization temperature is preferably 10 to 90° C. When the polymerization temperature is low, the polymerization rate and the productivity tend to decrease. When the polymerization temperature is high, the radical concentration in the reaction system tends to increase accelerating a termination reaction, and the initiator tends to be used ineffectively and required in a large amount.

The polymerization reaction is almost completed in 0.5 to hours.

According to the process mentioned above, for example, a vinylpyrrolidone polymer having a K value of 10 to 120 can be obtained.

A K value according to Fikentscher method is a value which represents a molecular weight and can be evaluated by the means as follows. If the K value is less than 20, a viscosity of the 5% (g/100 ml) aqueous solution is measured. If the K value is at least 20, a viscosity of the 1% (g/100 ml) aqueous solution is measured. The concentration of the sample is calculated based on dry substances thereof. If the K value is at least 20, 1.0 g of the sample is measured precisely, and put into a measuring flask having a capacity of 100 ml. Then, distilled water is added thereto at room temperature to dissolve the sample completely with shaking, and distilled water is added additionally thereto in total 100 ml precisely. Thirty minutes after the resulting sample solution is left to stand in a thermostat (25±0.2° C.), a measurement with Ubbelohde viscometer is carried out. The time required for the sample solution to flow between two of marked lines is measured. The mean is calculated by repeating the measurement several times. Measurement of distilled water is carried out similarly in order to provide a relative viscosity. Two of the resulting flow time are corrected based on a correction value according to Hagenbach-Couette.

$$K\ value = \frac{\sqrt{300 C log Z + (C + 1.5 C log Z)^2} + 1.5 C log Z - C}{0.15 C + 0.003 C^2}$$

In the above formula, Z is a relative viscosity ($\eta$ rel) of the solution at concentration C, and C is a concentration of a sample (%: g/100 ml).

The relative viscosity $\eta$ rel is calculated according to the formula as follows.

$\eta$ rel=(the flow time of the solution)/(the flow time of water)

According to the present invention, a vinylpyrrolidone polymer aqueous solution is purified by contacting it with anion exchange resin (basic ion exchange resin). A contact process is, for example, the process wherein an anion exchange resin is suspended in a vinylpyrrolidone polymer aqueous solution to make it fine, and thereafter filtration is carried out. Further, another example is the process wherein an anion exchange resin is used as a stationary phase and a vinylpyrrolidone polymer aqueous solution is poured thereinto.

Concerning the anion exchange resin, anything that is used generally as the anion exchange resin, for example, polystyrenetrimethylamine-divinylbenzene copolymer or polystyrenemonohydroxyethyldiethylamine-divinylbenzene copolymer, can be used as a composition. Particularly, polystyrenetrimethylamine-divinylbenzene copolymer is preferable because it has a relatively high heat-resisting temperature and can adsorb sulfate ion and sulfite ion effectively (for a relatively short time) by raising a temperature.

Furthermore, a cross linking agent such as divinylbenzene can be used in an amount of a range wherein the cross linking agent is used generally in an anion exchange resin, preferably 4 to 20% by mole, more preferable 6 to 12% by mole. When the cross linking agent is used in a too small amount, an ion exchange resin tends to become fragile and then tends to be easy to get mixed as a impurity in a product. When a cross linking agent is too much, an exchange capacity per unit weight decreases and an efficiency of adsorption decreases. There are, for example, gel type or macroporous type as a resin structure, and any type can be employed. In the present invention, gel type is preferable because of the high exchange capacity per unit weight thereof and low costs.

The anion exchange resin can be used at least 10 g, preferably 0.1 to 10 kg, based on 1 mole of sulfate ion and sulfite ion which are contained in a vinylpyrrolidone polymer aqueous solution. When the anion exchange resin is used in a small amount, sulfate ion and sulfite ion are not adsorbed and removed sufficientlly. When the anion exchange resin is used in a large amount, the recovery of a polymer tends to decrease.

The form of an anion exchange resin is not limited particularly. A globular form having 0.01 to 5 mm of a grain size is preferable, and a globular form having 0.1 to 1.5 mm of a grain size is more preferable. An anion exchange resin having a small grain size tends to be difficult to be separated from a polymer aqueous solution. An anion exchange resin having a large grain size tends to require an increased time for treatment or to require to be used in an increased amount.

The temperature to contact the product of a polymerization reaction with anion exchange resins can be changed within a wide range. The temperature is preferably 10 to 60° C., more preferably 25 to 50° C. When the temperature is low, the treatment tends to require a long time. When the temperature is high, anion exchange resins tends to be denatured.

The time to contact can be at least 1 minute, preferably 5 minutes to 24 hours. When the time to contact is short, adsorption and removal of sulfate ion and sulfite ion tends to be insufficient. When the time to contact is long, productivity tends to decrease.

The purification with anion exchange resins can provide a high purity VP polymer containing at most 10 ppm of sulfate ion and at most 20 ppm of sulfite ion, based on the VP polymer.

The treatment for adsorption can be carried out when sulfate ion and sulfite ion to be treated are dissolved and exist in a system as a clear solution. Concretely, a mixed solvent consisting of an organic solvent such as methanol, ethanol, isopropanol or acetone and water can be used. Preferably, a mixed solvent has at least 5% by volume of water based on the organic solvent. Also, a mixed solvent comprising at least 3 kinds of solvents can be used.

The present invention is explained in detail by means of the following Examples, but it is to be understood that the invention is not limited to only these Examples.

Process for Preparation

Reagents used in Examples (an anion exchange resin, active carbon) are showed all together below.

Anion exchange resin 1: polystyrenetrimethylamine-divinylbenzene (8% by mole of a cross linking agent, gel structure, 0.3 to 1.2 mm of a grain size, 60° C. of a heat-resisting temperature)

Anion exchange resin 2: polystyrenetrimethylamine-divinylbenzene (10% by mole of a cross linking agent, gel structure, 0.3 to 0.8 mm of a grain size, 60° C. of a heat-resisting temperature)

Anion exchange resin 3: polystyrenemonohydroxyethyldiethylamine-divinylbenzene (16% by mole of a cross linking agent, macroporous structure, 0.5 to 1.1 mm of a grain size, 35° C. of a heat-resisting temperature)

Anion exchange resin 4: polystyrenetrimethylamine-divinylbenzene (16% by mole of a cross linking agent, macroporous structure, 0.4 to 0.8 mm of a grain size, 60° C. of a heat-resisting temperature)

Active carbon: shirasagi C available from Takeda Chemical Industries, Ltd. (steam active carbon)

EXAMPLE 1

To an aqueous solution of the N-vinyl-2-pyrrolidone (hereinafter referred to as "VP") polymer synthesized by using 60 g of VP, 240 g of water, 0.21 g of sodium sulfite (0.35% by weight based on VP) and 0.15 g of tert-butyl hydroperoxide (0.25% by weight based on VP) 5 g of regenerated anion exchange resin 1 (2.8 kg based on 1 mole of sulfate ion and sulfite ion) was added and dispersed by stirring for 5 hours at 50 ° C., and then the VP polymer aqueous solution and the anion exchange resin were separated from each other by using a centrifuge.

EXAMPLE 2

Example 2 was carried out as identically as example 1, except using 5 g of anion exchange resin 2 (2.8 kg based on 1 mole of sulfate ion and sulfite ion) as an anion exchange resin instead of anion exchange resin 1.

EXAMPLE 3

To an aqueous solution of the VP polymer synthesized by using 90 g of VP, 210 g of water, 1.35 g of ammonium sulfite (1.5% by weight based on VP) and 0.72 g of tert-butyl hydroperoxide (0.8% by weight based on VP) 10 g of regenerated anion exchange resin 3 (2 kg based on 1 mole of sulfate ion and sulfite ion) was added and dispersed by stirring for 30 minutes at 25° C. and then the VP polymer aqueous solution and the anion exchange resin were separated from each other by using a centrifuge.

EXAMPLE 4

To an aqueous solution of the VP polymer synthesized by using 120 g of VP, 180 g of water, 6.6 g of ammonium sulfite (5.5% by weight based on VP) and 0.96 g of tert-butyl hydroperoxide (0.8% by weight based on VP), 25 g of regenerated anion exchange resin 4 (2 kg based on 1 mole of sulfate ion and sulfite ion) was added and dispersed by stirring for an hour at 50° C. and then the VP polymer aqueous solution and the anion exchange resin were separated from each other by using a centrifuge.

EXAMPLE 5

Ten grams of regenerated anion exchange resin 1 (2 kg based on 1 mole of sulfate ion and sulfite ion) was charged to an open column having a shape of a circular cylinder with 2cm of diameters, and then an aqueous solution of the VP polymer synthesized by using 90 g of VP, 210 g of water, 1.35 g of ammonium sulfite (1.5% by weight based on VP) and 0.72 g of tert-butyl hydroperoxide (0.8% by weight based on VP) was passed through the column at 60 g/hour at 25° C.

EXAMPLE 6

To an aqueous solution of the VP polymer synthesized by using 90 g of VP, 210 g of water/isopropanol (1:1 volume/volume), 1.35 g of ammonium sulfite (1.5% by weight based on VP) and 0.72 g of tert-butyl hydroperoxide (0.8% by weight based on VP), 10 g of regenerated anion exchange resin 2 (1.8 kg based on 1 mole of sulfate ion and sulfite ion) was added and dispersed by stirring for 30 minutes at 40° C. and then the VP polymer aqueous solution and the anion exchange resin were separated from each other by using a centrifuge.

COMPARATIVE EXAMPLE 1

VP polymer was synthesized by using 90 g of VP, 210 g of water, 0.32 g of sodium sulfite (0.35% by weight based on VP) and 0.23 g of tert-butyl hydroperoxide (0.25% by weight based on VP).

COMPARATIVE EXAMPLE 2

To an aqueous solution of the VP polymer synthesized by using 90 g of VP, 210 g of water, 1.35 g of ammonium sulfite (1.5% by weight based on VP) and 0.72 g of tert-butyl hydroperoxide (0.8% by weight based on VP), 50 g of regenerated active carbon of commercial origine was added and dispersed by stirring for an hour at 25° C. and then the VP polymer aqueous solution and the active carbon were separated from each other by using a centrifuge.

Means for Evaluation

Means for Evaluation are showed all together below.
Examples 1 to 6 and Comparative Example 2 were evaluated as follows, at two stages i.e. before and after purification.
Solids content: about 5 g of the resulting polymer aqueous solution after the polymerization was weighed out precisely, and dried at 105° C. for 12 hours. The weight of the evaporation residue was calculated as a solids content.
K value: a K value was evaluated as mentioned above.
Remaining monomer concentration: a liquid chromatography (HPLC) was performed and the amount of remainig monomer (vinylpyrrolidone) in the solids content (ppm) was quantified by a measurement of an adsorption intensity at 235 nm.
Sufate ion concentration: the amount of sufite ion in the solids content (ppm) was quantified by performing an ion chromatomatography.
Sufite ion concentration: the amount of sufite ion in the solids content (ppm) was quantified by performing an ion chromatomatography.
Solubility in an organic solvent: the external view of the state wherein 1 g of the solids content was dispersed in 9 g of isopropanol was observed with eyes. ○ means a clearness and × means whity turbidity.

Results

The results of Examples 1 to 6 and Comparative Examples 1 to 2 are shown in Table 1.

was an extremely small amount of the remaining sulfate ion and sulfite ion in the solids content and the solubility in an organic solvent was high.

INDUSTRIAL APPLICABILITY

According to the present invention, a high purity vinylpyrrolidone polymer which dissolves clearly in an organic solvent can be obtained.

What is claimed is:
1. A process for preparing a high purity vinylpyrrolidone polymer, which is characterized in polymerizing vinylpyrrolidone by using a redox initiator comprising an organic peroxide and a sulfite, and thereafter contacting the product with an anion exchange resin.
2. The process for preparing a high purity vinylpyrrolidone polymer of claim 1, wherein the sulfite is ammonium sulfite.
3. The process for preparing a high purity vinylpyrrolidone polymer of claim 1, wherein the organic peroxide is hydroperoxide.
4. The process for preparing a high purity vinylpyrrolidone polymer of claim 1, wherein the organic peroxide is tert-butyl hydroperoxide.
5. A high purity vinylpyrrolidone polymer containing a small amount of sulfate ion and sulfite ion, which is obtained by polymerizing vinylpyrrolidone using a redox initiator which contains an organic peroxide and a sulfite, and thereafter contacting the product with an anion exchange resin.
6. The high purity vinylpyrrolidone polymer of claim 5, which contains at most 10 ppm of sulfate ion and at most 20 ppm of sulfite ion, based on the vinylpyrrolidone polymer.
7. The process for preparing a high purity vinylpyrrolidone polymer of claim 2, wherein the organic peroxide is hydroperoxide.

TABLE 1

|  | EXAMPLE |  |  |  |  |  | COMPARATIVE EXAMPLE |  |
|---|---|---|---|---|---|---|---|---|
|  | 1 | 2 | 3 | 4 | 5 | 6 | 1 | 2 |
| Solids content (% by weight) | 20.2 | 20.2 | 30.4 | 40.2 | 30.4 | 30.6 | 20.4 | 30.2 |
| K value | 93.4 | 93.4 | 31.5 | 17.7 | 31.5 | 25.4 | 92.6 | 31.5 |
| Before purification |  |  |  |  |  |  |  |  |
| Remaining monomer concentration (ppm) | 2.3 | 2.3 | 6.1 | 0.7 | 6.2 | 5.9 | 1.2 | 6.4 |
| Sulfate ion concentration (ppm) | 2500 | 2500 | 4908 | 10021 | 5001 | 5308 | 2689 | 4878 |
| Sulfite ion concentration (ppm) | 320 | 320 | 270 | 74 | 281 | 417 | 341 | 312 |
| After purification |  |  |  |  |  |  |  |  |
| Remaining monomer concentration (ppm) | 2.6 | 2.3 | 6.3 | 0.7 | 6.4 | 5.8 | — | 6.1 |
| Sulfate ion concentration (ppm) | 3 | 1 | 8 | 2 | 2 | 0 | — | 4708 |
| Sulfite ion concentration (ppm) | 16 | 4 | 12 | 6 | 3 | 7 | — | 310 |
| Solbility for oranic solvent | ○ | ○ | ○ | ○ | ○ | ○ | × | × |

Compared to Comparative Example 1 wherein purification was not performed after polymerization and Comparative Example 2 wherein purification was performed with active carbon, Examples 1 to 6 wherein purification was performed with an anion exchange resin shows that there 8. The process for preparing a high purity vinylpyrrolidone polymer of claim 2, wherein the organic peroxide is tert-butyl hydroperoxide.

* * * * *